Nov. 29, 1949     G. I. BORGSTRÖM     2,489,447
BRAKING DEVICE FOR FISHING REELS
Filed July 13, 1945
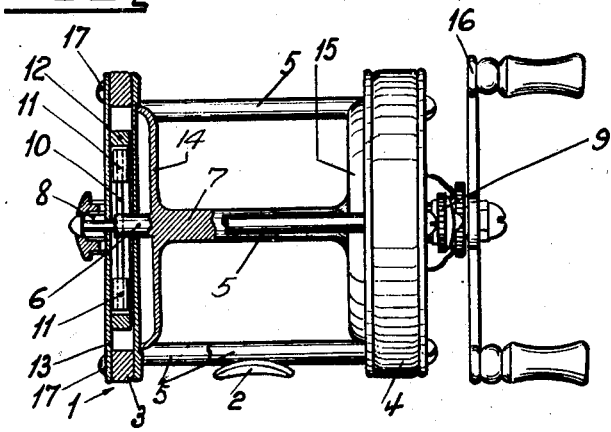
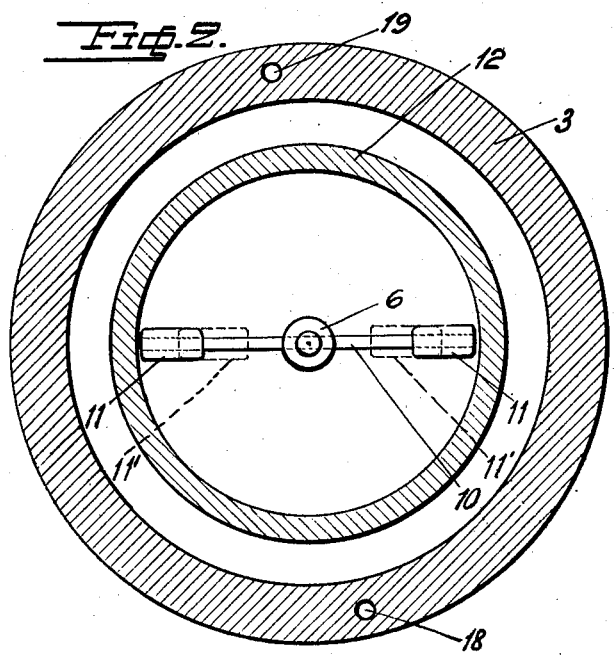
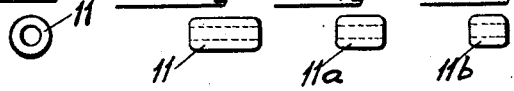
Inventor
G. I. Borgström
By Glascock Downing Seebold
Attys Patented Nov. 29, 1949

2,489,447

UNITED STATES PATENT OFFICE 2,489,447

BRAKING DEVICE FOR FISHING REELS

Göte Ingvar Borgström, Svangsta, Sweden

Application July 13, 1945, Serial No. 604,928
In Sweden November 27, 1944

1 Claim. (Cl. 242—84.5)

This invention relates to a regulator for the uncoiling of lines from reels, more particularly so-called spinning reels for fly-fishing rods.

When uncoiling cord or fishing line from a spinning reel for a fly-fishing rod it is desirable that the reel should be provided with a brake regulated so that the bait will not impart an excessively high speed of rotation to the spinning reel owing to its pull when making a cast. This would otherwise result in the reel continuing to rotate on account of its inertia after the pull of the line has ceased, and consequently too great a part of the line would be unwound unnecessarily, thus hindering the rapid withdrawal of the bait by winding up the line on the spinning reel after completing the cast. A further result when making a strong cast may be that after the bait has slowed down in consequence of the air resistance and force of gravity, and has reached the surface of the water, the pull on the line will cease but the spinning reel will nevertheless continue to rotate, whereby the portion of the line on the reel will have a higher velocity than the portion which has left the reel. The result of this will be that further line will not leave the reel but, on the other hand, the latter, owing to the so-called throw-back effect, will begin to coil up the unwound line on the reel again but in the reverse direction, or the accumulation of unwound line which has previously collected at the reel may become tangled so that it is practically impossible to straighten the line, or even where this can be accomplished successfully, the cast will have failed in any case, possibly resulting in an undersurface bite and the eventual loss of the bait.

The invention is characterized primarily in that the regulator consists of one or more sleeves, weights or the like, adapted to slide on the reel and participate in its rotation whereby the sleeve or weight, or alternatively the sleeves or weights are so arranged that by reason of its or their weight and/or centrifugal force, it or they is or are caused to lie up against and make frictional contact with a brake drum cooperating with it or them. The weight or sleeve, or alternatively the weights or sleeves may thereby be adapted to slide upon one or more arms or the like connected to the reel. The regulator may be built into a hollow space in one end wall of a supporting device for the reel. The brake drum may here consist of a ring rigidly connected to one end wall and surrounding the movable portion of the regulator. The sleeves or weights may be suitably arranged in such a way that they can be easily exchanged for larger, smaller, heavier or lighter sleeves or weights. Finally the regulator may be arranged in the end wall of a supporting device for a spinning reel which is located at the opposite end of the spinning reel with respect to a cranking device for the spinning reel, whereby the weights or sleeves may be suitably constructed of metal and/or fibrous material.

The invention is illustrated by way of example in the accompanying drawing, in which Fig. 1 is a side view of a spinning reel partly in section, the said spinning reel being provided with a regulator according to the invention. Fig. 2 shows the same spinning reel to a larger scale, viewed in cross-section through the regulator, and Figs. 3, 4, 5 and 6 show different forms of sleeves for the regulator in an end view and three side views.

Similar numerals refer to similar parts throughout the several views.

The spinning reel according to the figures consists of a frame 1 which is adapted to be fixed in a known manner by aid of a plate 2 to a fishing rod not shown. In said frame 1 consisting of two end walls 3 and 4 connected by struts 5 a spindle 6 for the reel 7 itself is supported at both ends in bearings 8 and 9. To said spindle 6 an arm 10, passing through said spindle 6, is rigidly connected, upon which sleeves or weights 11 are adapted to slide. Upon the rotation of said spindle 6 said sleeves 11 are thrown radially outwards, sliding on said arms 10 until they lie up against a brake drum 12 rigidly connected to an outer plate 13 of said frame 1 and surrounding said arms 10 and said sleeves 11. By means of the friction between said sleeves 11 and said brake drum 12, said arms 10 and therefore said spindle 6 for said reel 7 will be braked. With a high velocity of said spindle 6 the force of gravity will have little effect upon said sleeves 11, but at lower speeds of rotation said sleeves 11 can only operate with the help of the force of gravity and only along a part of the inner surface of said brake drum 12.

The spinning reel as a unit is of a construction known per se. Thus the actual spinning reel 7 is provided with two forked flanges 14, 15, and outside said flanges 14, 15 said spindle 6 is supported in said bearings 8, 9 in said end walls 3 and 4 respectively. The reel 7 is operated by a crank device 16 and a not shown gear. Said crank device 16 and said not shown gear is supported by said end wall 4 and said gear located in a hollow space in the latter. It will be seen from Fig. 1 that the regulator may be built into one end wall, the left-hand one, and is completely protected by the latter. This end wall supports the brake drum 12.

Said outer plate 13 of said end wall 3 is by aid of screws 17 as illustrated in Fig. 1 fixed to the remaining part of said end wall 3 and is easily removable from the latter for the purpose of exchanging the sleeves for larger or smaller ones.

Figure 2 illustrates tapped holes 18 and 19 in said end wall 3 for said screws 17 and in the same figure the lines of short dashes mark alternative positions 11' of said sleeves 11. Figures 3 and 4 illustrate an end view and a side view respectively of a sleeve 11 and Figures 5 and 6 two types of shorter sleeves marked 11a and 11b respectively.

It will be seen from the foregoing description that the regulator according to the invention operates entirely automatically when the line is uncoiled from the reel. With a long and therefore a strong cast, the spinning reel will be set in rapid rotation and the centrifugal force together with the force of gravity will then exert their greatest braking effect through the sleeves upon the brake drum. With shorter and therefore less powerful casts the spinning reel will be set in less rapid rotation and the centrifugal force together with the force of gravity or the latter alone, will then exercise a less powerful braking action through the sleeves upon the brake drum. Thus the braking effect is regulated automatically according to the strength of the cast.

I do not wish to be limited as to details of construction, as these may be modified in many particular parts without departing from the spirit of my invention.

What I claim is:

A regulator for the uncoiling of a line from a reel consisting of a spool rotatably mounted in a frame, comprising at least one radially extending arm fixed to said spool, an unimpeded centrifugal body slidable on said arm exclusively radially with respect to said spool and participating in the rotation of said spool and said arm, and a brake drum, said centrifugal body being so arranged on said arm that it during rotation of said spool and said arm frictionally engages said brake drum on an area surrounding a point radially outwardly of the outer end of said arm.

GÖTE INGVAR BORGSTRÖM.

REFERENCES CITED

The following references are of record in the file of this patent:

UNITED STATES PATENTS

| Number | Name | Date |
|---|---|---|
| 1,347,529 | Wherry | July 27, 1920 |
| 1,566,594 | Graham | Dec. 22, 1925 |

FOREIGN PATENTS

| Number | Country | Date |
|---|---|---|
| 5,531 | Great Britain | Nov. 5, 1914 |
| 486,135 | Great Britain | May 31, 1938 |